United States Patent [19]

Lo et al.

[11] Patent Number: 4,866,125
[45] Date of Patent: Sep. 12, 1989

[54] STYRENIC POLYCARBONATE ALLOYS

[75] Inventors: Lawrence Y. Lo, Lexington; Paul R. Boulier, Leominster, both of Mass.

[73] Assignee: Polysar Financial Services S.A., Fribourg, Switzerland

[21] Appl. No.: 286,156

[22] Filed: Dec. 19, 1988

[51] Int. Cl.$^4$ ............................................. C08L 69/00
[52] U.S. Cl. ........................................ 525/67; 525/92
[58] Field of Search ........................... 525/67, 92, 468

[56] References Cited

U.S. PATENT DOCUMENTS

| | | | |
|---|---|---|---|
| 4,172,859 | 10/1979 | Epstein | 428/402 |
| 4,461,868 | 7/1984 | Lindner et al. | 525/67 |
| 4,530,965 | 7/1985 | Bourland | 525/67 |
| 4,544,706 | 10/1985 | Finch et al. | 525/146 |
| 4,564,654 | 1/1986 | Serini et al. | 525/67 |
| 4,657,970 | 4/1987 | Shiraki et al. | 525/57 |
| 4,680,337 | 7/1987 | Biletch et al. | 525/53 |
| 4,696,972 | 9/1987 | Bourland | 525/67 |

Primary Examiner—Theodore E. Pertilla
Attorney, Agent, or Firm—Stevens, Davis, Miller & Mosher

[57] ABSTRACT

Blends of polycarbonates and a graft copolymer comprising a copolymer of a vinyl aromatic monomer and one or more $C_{2-8}$ alkyl esters of $C_{3-6}$ ethylenically unsaturated carboxylic acids and methyl methacrylate grafted on to a styrene butadiene or styrene isoprene block copolymer, have improved toughness and processability. The blends may be prepared using intensive mixing or by solution blending.

9 Claims, 3 Drawing Sheets

IZOD IMPACT STRENGTH OF GRAFT COPOLYMER/POLYCARBONATE BLENDS

IZOD IMPACT STRENGTH OF GRAFT COPOLYMER/
POLYCARBONATE BLENDS

TENSILE YIELD STRESS

TENSILE YIELD STRENGTH OF GRAFT COPOLYMER/ POLYCARBONATE BLENDS

APPARENT VISCOSITY OF GRAFT COPOLYMER/POLYCARBONATE BLEND (50/50) AND POLYCARBONATE PER SE

STYRENIC POLYCARBONATE ALLOYS

FIELD OF THE INVENTION

The present invention relates to polymer blends based on polycarbonates and copolymers of vinyl aromatic-alkyl acrylate-methyl methacrylate polymers grafted on to di or tri block vinyl aromatic-$C_{4-6}$ conjugated diolefin block copolymers, which blends have improved physical properties.

BACKGROUND OF THE INVENTION

Polycarbonates are a versatile class of resins. It is desirable to improve the physical properties, and particularly the toughness and processability of the polycarbonates.

There are several patents which propose to improve the impact resistance of polycarbonate resins by incorporating therein a styrene-acrylonitrile type polymer. Representative of this art are U.S. Pat. Nos. 4,544,706 issued Oct. 1, 1985 and 4,564,654 issued Jan. 14, 1986. The compositions of the present invention do not incorporate acrylonitrile containing polymers.

U.S. Pat. Nos. 4,530,965 and 4,696,972 issued July 23, 1985, and Sept. 29, 1987 disclose the modification of polycarbonate resins with styrene-maleic anhydride type resins. The present invention does not contemplate the use of such resins.

U.S. Pat. No. 4,461,868 issued July 24, 1984 discloses a tertiary blend of polycarbonate resin with a thermoplastic alkyl acrylate and an acrylate grafted onto a rubbery core such as polybutadiene. The present invention does not comtemplate such a composition.

U.S. Pat. No. 4,680,337 issued July 14, 1987 discloses a method to make a thermoplastic polymer having good elongation and a high degree of clarity. The patent does not suggest the polymers could be used to modify the properties of polycarbonate resins.

The present invention seeks to provide novel polycarbonate graft copolymer blends having improved physical properties.

SUMMARY OF THE INVENTION

The present invention provides a polymer blend comprising:

(A) from 20 to 90 part by weight of one or more homo-and co-polycarbonates which are based on one or more poly phenols selected from the group consisting of hydroquinone, resorcinol, and polyphenols of the formula.

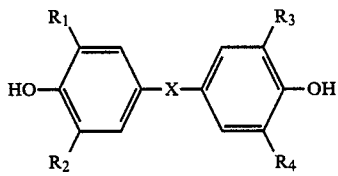

wherein $R_1$ $R_2$, $R_3$ and $R_4$; are independently selected from the group consisting of a hydrogen atom, a chlorine atom, a bromine atom, and a $C_{1-4}$ alkyl radical; and X is a bond or divalent radical selected from the group consisting of $C_{1-10}$ alkylene radicals; $C_{2-8}$ alkenylene radicals, and $C_{6-8}$ cycloalkylene radicals; and (B) from 80 to 10 parts by weight of a graft copolymer comprising (i) 25 to 75 parts by weight of a $C_{8-10}$ vinyl aromatic monomer which is unsubstituted or substituted at the vinyl radical by a $C_{1-2}$ alkyl radical and which may be substituted in the aromatic ring by up to two substituents selected from the group consisting of chlorine and bromine atoms and $C_{1-4}$ alkyl radicals;

(ii) from 7 to 30 parts by weight of a copolymerizable $C_{2-8}$ alkyl or hydroxy alkyl ester of a $C_{3-6}$ ethylenically unsaturated acid provided that homopolymers of such esters have a Tg of less than 40° C.; and (iii) from 10 to 50 parts by weight of methyl methacrylate which is grafted to from 2 to 20 parts by weight of linear or radial di and tri block copolymers having a molecular weight of not less than 75,000 and a styrene content from 20 to 50 weight percent selected from the group consisting of styrene-butadiene diblock copolymers. styrene-butadiene-styrene triblock copolymers, styrene-isoprene diblock copolymers, styrene-isoprene-styrene triblock copolymers, partially hydrogenated styrene-butadiene-styrene triblock copolymers, and partially hydrogenated styrene-isoprene-styrene triblock copolymers., The present invention also provides a process for preparing the above blend comprising melt blending the polycarbonate and the graft copolymer using an intensive mixer or solution blending the polycarbonate and the graft copolymer. Typically the intensive mixer is operated at a temperature from 190° to 300° C. and at from 50 to 300 RPM's. Suitable intensive mixers for melt blending include those currently used in the plastics industry such as extrusion and injection molding machines, and other mixing/compounding equipment.

DETAILED DESCRIPTION OF THE INVENTION

Figure 1:
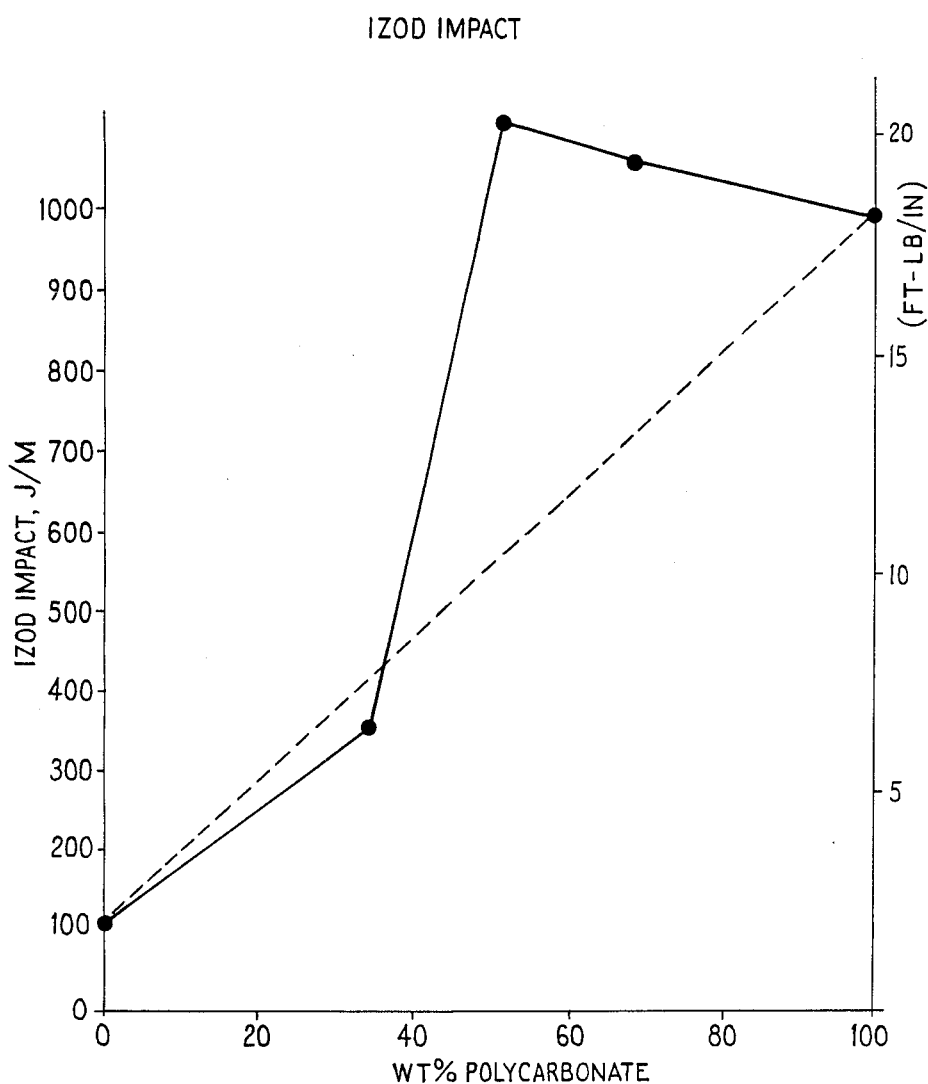
FIG. 1 is a plot of the Izod impact of blends of polycarbonate with the graft copolymer and the predicted value (dashed line).

In accordance with the present invention the weight ratio of polycarbonate to graft copolymer in the blend is from 20:80 to 90:10 preferably from 33:67 to 75:25 most preferably from 75:25 to 45:55.

The polycarbonates useful in accordance with the present invention are prepared in a conventional manner such as by melt transesterification or by the reaction of polyphenols usually bisphenols and phosgene by a two phase boundary process.

Suitable polyphenols include hydroquinone; resorcinol and polyphenols of Formual 1 as described above. Preferred polyphenols are diphenols including: 4,4' dihydroxydiphenyl; 2,2-bis-(4-hydroxyphenyl) propane; 2,4'bis-(4 hydroxyphenyl)-2-methylbutane; 1,1-bis-(4-hydroxyphenyl)-cyclohexane; beta,beta-bis-(4 hydroxyphenyl)-p-diisopropylbenzene; 2,2-bis-(3-chloro-4-hydroxyphenyl) propane, 2,2-bis-(3,5-dichloro-4-hydroxyphenyl) propane; and 2,2-bis-(3,5-dichloro-4-hydroxyphenyl) propane.

Suitable polycarbonates have a weight average molecular weight (MW) from about 10,000 to 100,000 preferably from 20,000 to 50,000 as determined by measuring its relative viscosity in a suitable solvent such as $CH_2Cl_2$ at a concentration of 0.5 g in 100 ml of solvent.

The polycarbonate is blended with a graft copolymer. The graft copolymer comprises:

25 to 75, preferably from 30 to 65 parts by weight of a $C_{8-10}$ vinyl aromatic monomer; from 7 to 30 preferably 8 to 20 parts by weight of a $C_{2-8}$ alkyl or hydroxyl alkyl ester of a $C_{3-6}$ ethylenically unsaturated carboxylic acid provided that homopolymers of such esters have a Tg of less than 40° preferably less than 35° C.; and from 10 to 50 preferably 15 to 40 parts by weight of methyl methacrylate which has been grafted to a linear or radial di-or tri-block copolymer having a molecular weight of not less than 75,000, preferably from 175,000 to 275,000, and a styrene content from 20 to 50 weight percent selected from the group consisting of styrene-butadiene-di block copolymers styrene-butadiene-styrene triblock copolymers, styrene isoprene diblock copolymers, styrene-isoprene-styrene triblock copolymers and partially hydrogenated deratives of the triblock copolymers.

Suitable vinyl aromatic monomers include styrene, alpha methylstyrene, p-methylstyrene, p-tertiary-butylstyrene. Suitable esters include butyl acrylate, ethylhexyl acrylate, and hydroxyethyl acrylate, most preferably butyl acrylate. Preferred block copolymers are styrene-butadiene-styrene triblock copolymers and styrene-isoprene-styrene triblock copolymers.

Suitable graft polymers and the process for their preparation are more fully described in U.S. Pat. No. 4,680,337 issued July 14, 1987, assigned to Polysar Financial Services S.A., the entire text of which is hereby incorporated by reference. In general the graft polymers contain from about 8 to 30 percent of the total polymer of gel. The gel is that portion of the polymer which is insoluble in a solvent such as toluene or tetrahydrofuran. In general the weight of the gel is from 1.5 to 4 times the weight of the block copolymer.

The blends of the present invention may be prepared by melt blending or solution blending.

The melt blends of the present invention may be prepared by first preparing a mixture of polycarbonate and the graft polymer in the required weight ratio. Preferably the components are dry before melt blending. Suitable drying times and temperatures are well known to those skilled in the art. Drying condition may generally range from 60° to 120° C., for from about 3 to 24 hours. The mixture of resin pellets is then fed into an intensive mixer such as a twin screw extruder. The extruder screw configuration and rpm's of the extruder are selected to provide adequate mixing. Typically the extruder is operated at from 50 to 300 preferably 100 to 200 most preferably 120 to 170 RPM. The extruder maybe operated at a barrel temperature of from 190°–300° C. preferably 220°–260° C.

The blends of the present invention may be prepared by solution blending. Typically the polycarbonate and the graft copolymer, in an appropriate weight ratio are dissolved in a suitable solvent. Alternatively, suitable weight ratio of solutions of polycarbonate and graft copolymer may be blended to provide the required ratio of polycarbonate to graft copolymer. In some instances it may be possible to add either polycarbonate or graft copolymer to a flowing solution of graft copolymer or polycarbonate respectively, to provide for continuous or semi continuous processing. Useful solvents include solvents such as tetrahydrofuran, and methylene chloride. The blend may be recovered either by evaporation of the solvent or by precipitation of the blend from the solvent. These techniques are well known to those skilled in the art.

The above mixing techniques should be used to produce a relatively uniform mixture of graft copolymer and polycarbonate. Depending on the relative ratio of the two components (e.g. the polycarbonate and the graft copolymer), the polyblend can vary in its physical appearance from one or more dispersed phases within a continuous phase to co-continuous phases of the two materials. Thus it is extremely difficult to try to characterize the particle distribution and/or particle size. The properties of the compositions of the present invention are obtained over a broad ratio of the components.

Conventional additives may be used in association with the blends. Typically, one or more of heat and light stabilizers, antioxidants, flame and smoke retardents, processing aids and mold release agents may be used in a total amount of up to about 25, preferably less then 15 weight percent of the blend. The selection and amount of any specific agent may be determined by those skilled in the art by routine, non inventive testing.

Reinforcing agents such as fibers including metal fibers such as steel, aluminium, and boron, organic fibers such as aramid fibers (e.g. Kevlar (trademark), carbon fibers, and ceramic fibers may be included in the blends of the present invention. The fibers may be used in amounts up to about 50, more preferably from 20 to 40 weight percent. Up to 50 weight percent of particulate fillers and/or warpage control agents, such as mica, talc, calcium carbonate and the like may be incoporated into the compositions of the present invention.

The present invention will be illustrated by the following examples in which, parts are parts by dry weight (e.g. lb.) unless otherwise indicated.

In the examples, the polycarbonates were based on bisphenol A (2,2-bis-(4 hydroxy phenyl) propane). The carbonates used were obtained from General Electric and are sold under the trademark LEXAN. The graft polymers used are manufactured by Polysar Incorporated. The graft polymer comprised 40 percent styrene, 50 percent of a blend of a lower alkyl acrylates and methacrylates grafted onto 10 percent of a styrene-butadiene-styrene triblock copolymer.

EXAMPLE 1

A series of blends of polycarbonate (grade 101)-graft resin were prepared in weight ratios of: 33:67, 50:50, 67:33 and conditioned 16 hours at 70° C. The conditioned mixes were extruded using a twin screw extruder operated at 120 RPM and 200°–250° C. The resulting blend in pellet form was then extruded into standard "bars" for tensile testing. The following tests were conducted on the "bars".

| Tensile Yield Strength | ASTM D-638 |
| Flexural Strength | ASTM D-790 |
| Flexural Modulus | ASTM D-790 |

| | -continued | |
|---|---|---|
| Elongation | ASTM D-638 | |
| Izod impact notched | ASTM D-256 | |
| Heat Deflection Temp. | ASTM D-648 | |
| Melt Flow, condition I | ASTM D-1238 | |

Figure 2:
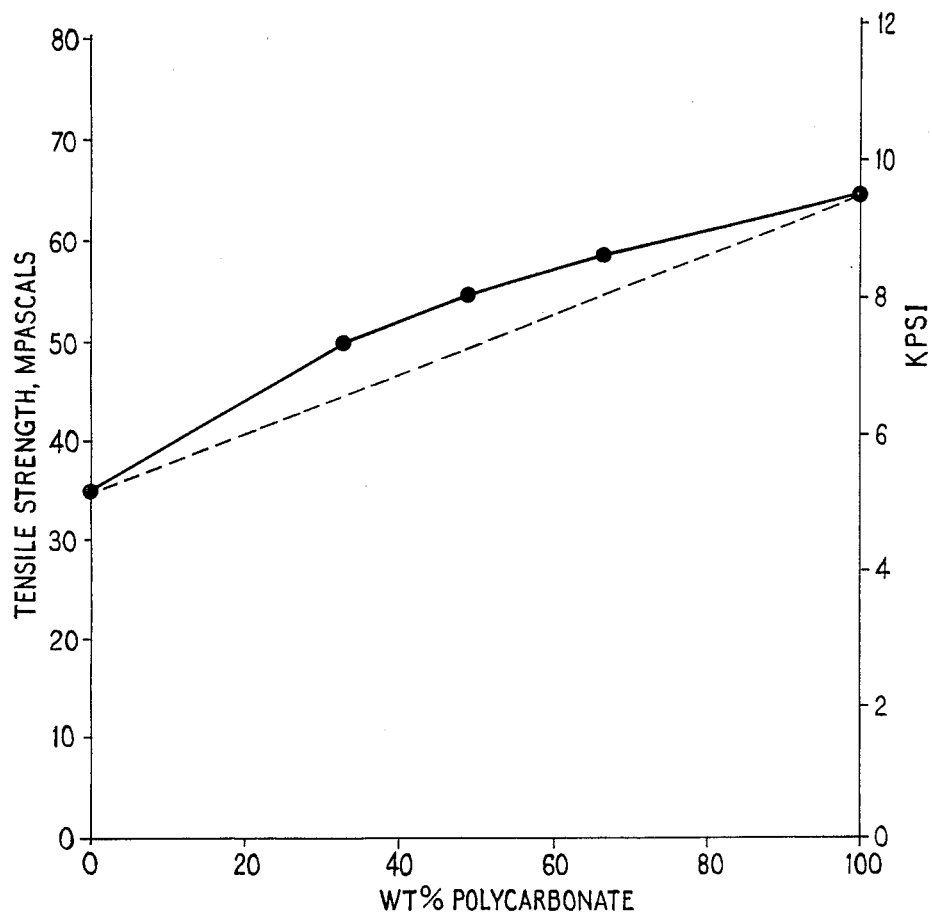
FIG. 2 is a plot of the tensile yield of blends of polycarbonate and the graft copolymer and the predicted values.
Figure 3:
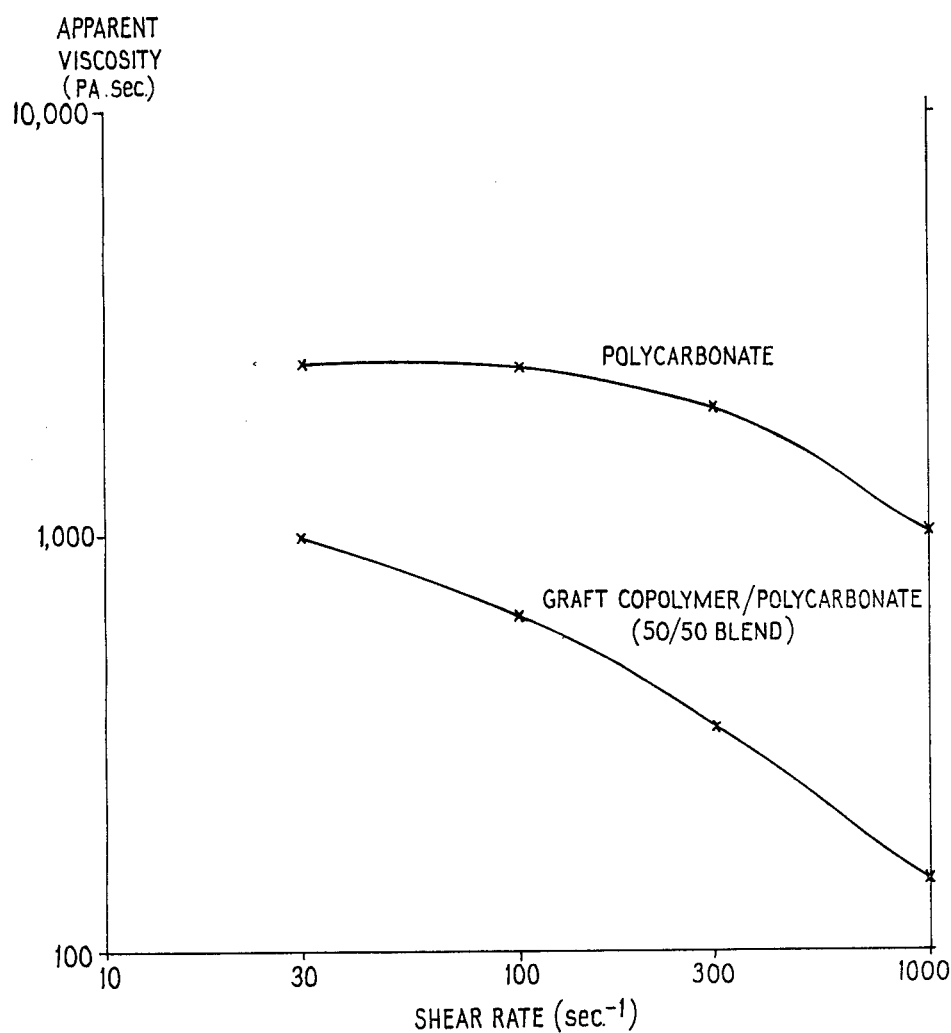
FIG. 3 is a plot of the apparent viscosity of a 50:50 blend of the graft copolymer and polycarbonate, and the polycarbonate per se at various shear rates.

The results of the lzod impact testing is plotted in FIG. 1, which also contains a plot of the predicted Izod impact values (dashed line). The results of the tensile yield tests are plotted in FIG. 2 which also contains a plot of the predicted values (dashed line).

The results of the tests of the polycarbonate/graft polymer blends at a weight ratio of 50:50 and 67:33 are set forth in Table 1.

TABLE I

PHYSICAL PROPERTIES OF POLYCARBONATE/GRAFT COPOLYMER BLEND

| PROPERTY | UNIT | GRAFT COPOLYMER/ POLYCARBONATE | |
|---|---|---|---|
| | | (50/50) | (33/67) |
| Tensile Yield Strength | psi | 8,220 | 8,800 |
| Flexural Strength | psi | 12,150 | 14,000 |
| Flexural Modulus | psi | 361,000 | 423,000 |
| Elongation | % | 125 | 200 |
| Izod Impact, Notched | ft-lb/inch | 23 | 19 |
| Heat Deflection Temp. | °F. @ 264 psi | 198 | 211 |
| Heat Deflection Temp. | °F @ 66 psi | 247 | 262 |
| Melt Flow, Condition I | g/10 min. | 3.3 | 1.8 |

EXAMPLE II

For comparative purposes the Izod impact and melt flow index at Condition I of a 50:50 polycarbonate (grade 101): graft copolymer and polycarbonate per se were measured the results are set forth in Table II.

TABLE II

COMPARISON OF GRAFT COPOLYMER/POLYCARBONATE BLEND AND POLYCARBONATE

| | GRAFT COPOLYMER POLYCARBONATE (50/50) | POLY-CAR-BONATE |
|---|---|---|
| Izod Impact Strength (ft-lb/in) | | |
| 1/8", 73° F. | 23 | 17 |
| 1/4", 73° F. | 9.5 | 2 |
| 1/8", −20° F. | 10 | 2 |
| 1/8", 73° F, after heat aging at 120° C. for 24 hours | 19 | 1.5 |
| Melt Flow, Condition I (g/10 min) | 3.3 | 1.8 |
| Molding Temp., Front/Rear (°F.) | 475/470 | 590/545 |
| Specific Gravity (g/cm³) | 1.15 | 1.20 |

The results of these tests show an unexpected improvement in the properties of a blend of polycarbonate and graft copolymer over the predicted values.

EXAMPLE III

A 50:50 blend of graft copolymer and polycarbonate (Grade 141) was prepared. Samples of the blend were extruded and tested for Izod impact strength (ASTM D-256). The impact strength of the blend was 18 ft.-lb./inch. The graft copolymer had an Izod impact of 2 ft.-lb./inch. The polycarbonate has an Izod impact of 15 ft.-lb./inch. The predicated value of the Izod impact strength of the 50:50 blend is about 8.5 ft.-lb./inch. The acutal impact strength is about twice the predicted impact strength.

EXAMPLE IV

The apparent viscosity at various shear rates of polycarbonate (grade 101) and a 50:50 blend of graft copolymer/polycarbonate were measured and plotted on log scale graph paper. Figure III is a plot of the apparent viscosity of the polymer as a function of shear rate. The plot shows that the blend has improved flow characteristics over the polycarbonate per se.

We claim:
1. A polymer blend comprising:
(A) from 20 to 90 part by weight of one or more homo-and co-polycarbonates which are based on one or more poly phenols selected from the group consisting of hydroquinone, resorcinol, and polyphenols of the formula

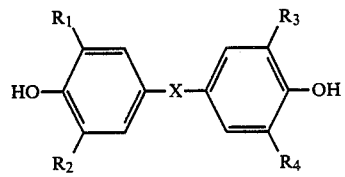

wherein
$R_1$, $R_2$, $R_3$, and $R_4$ are independantly selected from the group consisting of a hydrogen atom, a chlorine atom, a bromine atom, and a $C_{1-4}$ alkyl radical; and
X is a bond or divalent radical selected from the group consisting of $C_{1-10}$ alkylene radicals; $C_{2-8}$ alkenylene radicals, and $C_{6-8}$ cycloalkylene radicals; and
(B) from 80 to 10 parts by weight of a graft copolymer comprising
(i) 25 to 75 parts by weight of a $C_{8-10}$ vinyl aromatic monomer which is unsubstituted or substituted at the vinyl radical by a $C_{1-2}$ alkyl radical and which may be substituted in the aromatic ring by up to two substituents selected from the group consisting of chlorine and bromine atoms and $C_{1-4}$ alkyl radicals;
(ii) from 7 to 30 parts by weight of a copolymerizable $C_{2-8}$ alkyl or hydroxy alkyl ester of a $C_{3-6}$ ethylenically unsaturated acid provided that homopolymers of such esters have a Tg of less then 40° C.; and
(iii) from 10 to 50 parts by weight of methyl methacrylate which is grafted to from 2 to 20 parts by weight of linear or radial di and tri block copolymers having a molecular weight of not less than 75,000 and a styrene content from 20 to 50 weight % selected from the group consisting of styrene-butadiene diblock copolymers, styrene-butadiene-styrene triblock copolymers, styrene-isoprene diblock copolymers, styrene-isoprene-styrene triblock copolymers, partially hydrogenated styrene-butadiene-st yrene triblock copolymers, and partially hydrogenated styrene-isoprene-styrene triblock copolymers.
2. A polymer blend according to claim 1 wherein said polycarbonate is based on a diphenol selected from the group consisting of 4,4′ dihydroxydiphenyl; 2,2-bis-(4- hydroxyphenyl) propane; 2,4-bis-(4 hydroxyphenyl)-2-methylbutane; 1,1-bis,(4-hydroxyphenol)-cyclohexane; beta,beta-bis-(4 hydroxyphenyl)-p-diisopropylbenzene; 2,2-bis-(3-chloro-4-hydroxyphenyl)propane, 2,2-bis-(3,5-dichloro-4-hydroxyphenyl) propane; and 2,2-bis-(3,5-dichloro-4-hydroxyphenyl) propane.

3. A polymer blend according to claim 2 wherein said graft copolymer comprises:

from 30 to 65 parts by weight of said vinyl aromatic monomer;

from 8 to 20 parts by weight of said copolymerizable $C_{2-8}$ alkyl or hydroxyl alkyl ester of a $C_{3-6}$ ethylenically unsaturated carboxylic acid which ester forms a homo polymer having a Tg of less than 35° C.;

from 15 to 40 parts by weight of methyl methacrylate and from 4 to 12 parts by weight of said di or tri-block copolymer.

4. A polymer blend according to claim 3 wherein said aromatic monomer is selected from the group consisting of styrene, p-methyl styrene, p-tertiary butyl styrene, and dimethyl styrene.

5. A polymer blend according to claim 4 wherein said $C_{2-8}$ alkyl or hydroxy alkyl ester of a $C_{3-6}$ ethylenically unsaturated carboxylic acid is selected from the group consisting of butyl acrylate and ethylhexyl acrylate.

6. A polymer blend according to claim 5 wherein in said graft copolymer said di or tri-block copolymer is a tri-block copolymer having a molecular weight from 175,000 to 275,000 selected from the group consisting of styrene-butadiene-styrene triblock copolymers, and styrene-isoprene-styrene triblock copolymers.

7. A polymer blend according to claim 6 wherein said polycarbonate is based upon 2,2'-bis-(4 hydroxyphenyl) propane.

8. A polymer blend according to claim 7 wherein the weight ratio of polycarbonate to graft copolymer is from 33:67 to 75:25.

9. A polymer blend according to claim 8 wherein in the weight ratio of polycarbonate to graft copolymer is from 75:25 to 45:55.

* * * * *